No. 733,793. PATENTED JULY 14, 1903.
J. N. ARRIAGA.
GAME APPARATUS.
APPLICATION FILED NOV. 12, 1902.
NO MODEL. 2 SHEETS—SHEET 1.
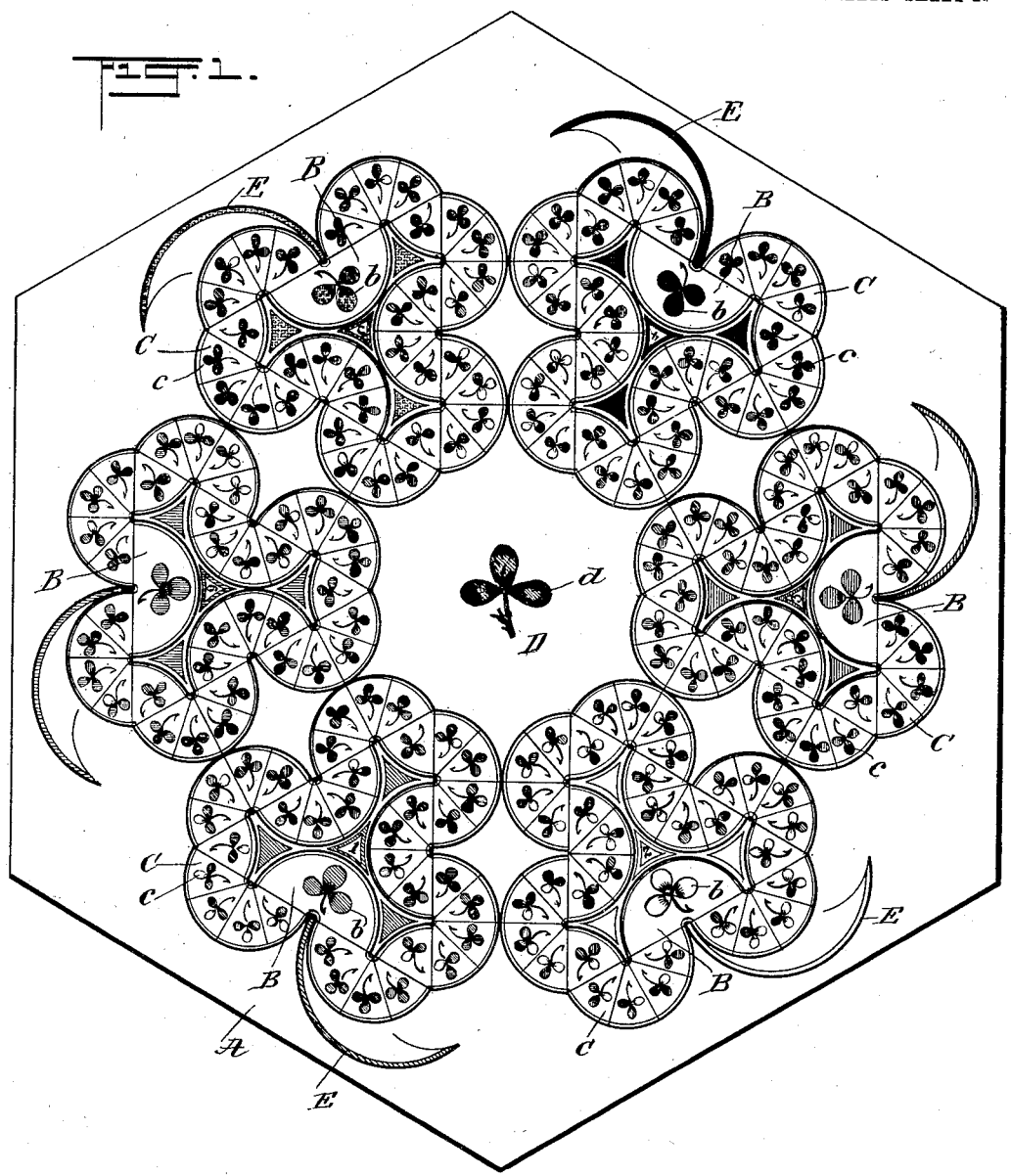
WITNESSES:
INVENTOR
Juan N. Arriaga
BY
ATTORNEYS.

No. 733,793. PATENTED JULY 14, 1903.
J. N. ARRIAGA.
GAME APPARATUS.
APPLICATION FILED NOV. 12, 1902.
NO MODEL. 2 SHEETS—SHEET 2.
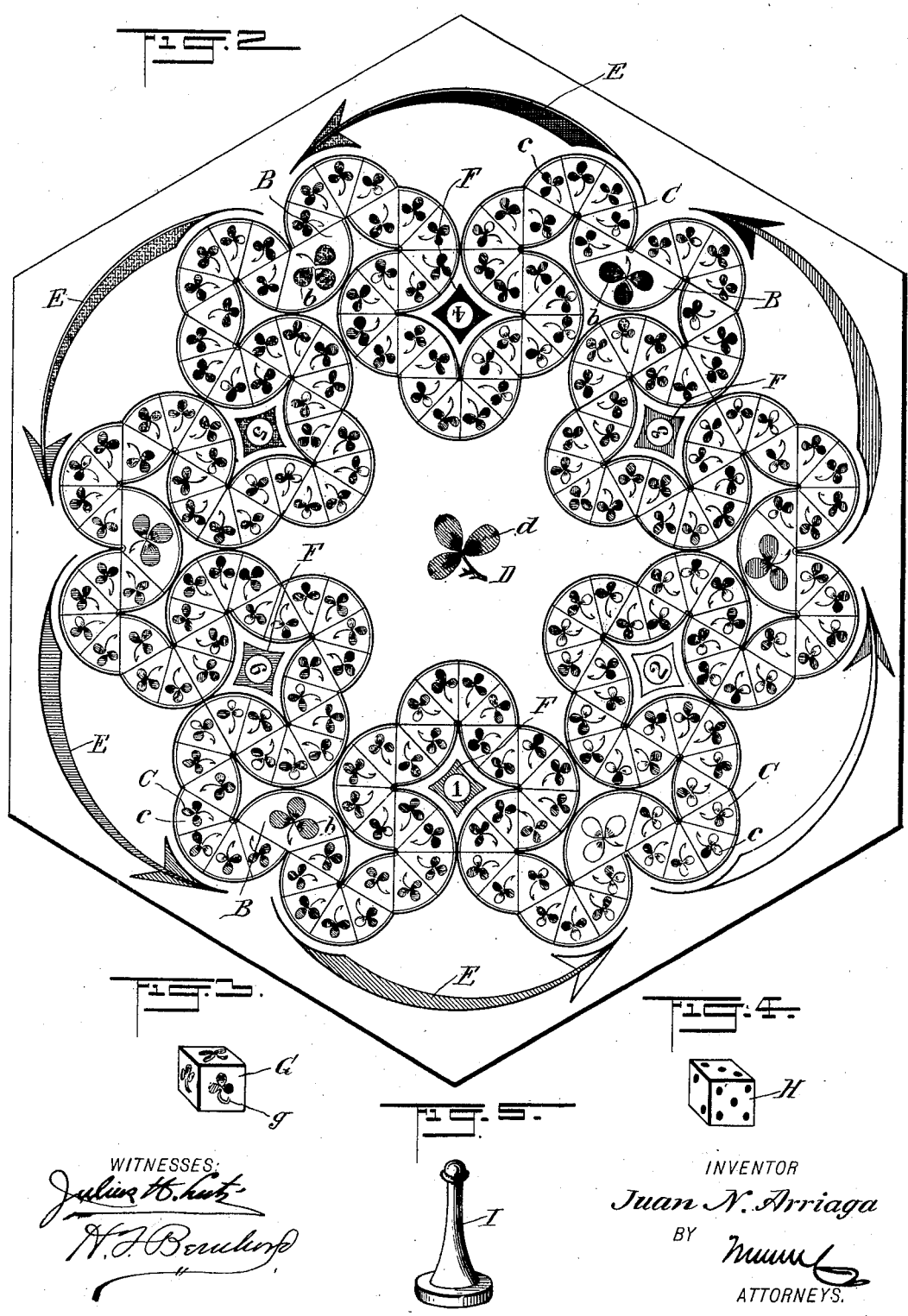
INVENTOR
Juan N. Arriaga No. 733,793. Patented July 14, 1903.

UNITED STATES PATENT OFFICE.

JUAN N. ARRIAGA, OF MEXICO, MEXICO.

GAME APPARATUS.

SPECIFICATION forming part of Letters Patent No. 733,793, dated July 14, 1903.

Application filed November 12, 1902. Serial No. 131,018. (No model.)

*To all whom it may concern:*

Be it known that I, JUAN N. ARRIAGA, a citizen of the Republic of Mexico, and a resident of the city of Mexico, Mexico, have invented a new and useful Improvement in Game Apparatus, of which the following is a full, clear, and exact description.

My invention relates to improvements in game apparatus; and the object that I have in view is to provide a simple and cheap construction which will afford entertainment in playing the game.

The improved game contemplates the employment of a chart having a series of initial or starting divisions and a plurality of succeeding divisions arranged in a desired order one after the other, said initial divisions bearing designating symbols or characters, such as clover-leaves, which appear in contrasting colors and each subdivision having similar symbols. With the chart is associated a number of dice having symbols in contrasting colors to those in the initial divisions, a number of ordinary dice, and a number of chessmen of any desired pattern, which are to be placed in the starting-divisions and moved into or through the subdivisions of the chart.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is a plan view of a game board or chart constructed in accordance with my invention. Fig. 2 is a similar plan view of another form of the game board or chart. Fig. 3 is an elevation of one of the dice used in playing the game. Fig. 4 is an elevation of an ordinary die, and Fig. 5 is a detail view of one of the chessmen.

In the construction shown by Fig. 1 the game-board A is of hexagonal form, although the shape is not material. The active face of the game-board is provided with a chart having a plurality of sections arranged in the order shown. This chart is provided with a series of initial or starting divisions (indicated at B) each in the form of a semicircle, and these starting-divisions are provided with symbols or designating characters $b$. In the example shown these symbols are represented as clover-leaves, each having three lobes. An essential feature of the invention consists in making these symbols $b$ in contrasting colors. I prefer to use six divisions with a corresponding number of symbols, and these symbols are preferably green, white, red, black, yellow, and blue.

Another essential feature of the chart consists in a plurality of subdivisions, (indicated at C.) These subdivisions may be of any desired number, and they are preferably in the form of segments of circles, the subdivisions lying adjacent to each other on lines which are approximately radial to the starting or initial division B. In the chart shown by Fig. 1 the subdivisions C are disposed in a group around the starting or initial division B, and preferably the plurality of subdivisions C of each group are disposed in the form of a cloverleaf approximately. The groups of subdivisions C around the supporting-divisions B are assembled around a central space D, having a clover-leaf symbol $d$, and these groups of subdivisions touch or intersect one with the other at any suitable number of points, as shown by the drawings. In each subdivision C of each group of segmental subdivisions is a symbol $c$, corresponding in form to the symbol $b$ in the starting-divisions B; but the symbols $c$ in the subdivisions may be colored in a predetermined order or indiscriminately. I prefer, however, to employ symbols $c$, which are colored green, white, red, black, yellow, and blue, so that the symbols $c$ in the groups of subdivisions will be colored correspondingly to the symbols $b$ in the starting-divisions. From each clover-shaped group of subdivisions C, assembled around each starting-division B, extends a stem E, which is curved and provided at its outer extremity with an arrow-head. These curved stems all point in the same direction, and they indicate the direction in which the chessmen should be moved after the game is started. I do not, however, desire to confine myself to the particular disposition of the groups of subdivisions in the form of clover-leaves as shown by Fig. 1, because the special arrangement of these subdivisions around the initial or starting divisions may be varied. One variation in the disposition of the subdivisions is represented by the chart shown in Fig. 2; but this chart embodies the generic features of the initial or starting divisions B, having the symbols *b* and the plurality of segmental subdivisions C, each having an appropriate clover-leaf symbol *c*. The segmental subdivisions C are disposed, primarily, to form semicircular sections which begin at the initial divisions B, so as to extend in opposite directions therefrom, after which the semicircular sections of segmental subdivisions are assembled in the form of clover-leaves around the numbered stations F. These numbered stations "1 2 3 4 5 6" are disposed in circular order around the central panel or section D, having the symbol *d*, and the stations 1 to 6, inclusive, are provided in contrasting colors. The segmental subdivisions C are grouped around the numbered stations F in the form of clover-leaves, except that certain intermediate subdivisions C are employed to connect them with the starting-divisions B. The chart of Fig. 2 also embodies the arrow-shaped pointers E, which extend from the groups of subdivisions, all of these pointers looking in the same direction for the purpose of indicating the direction in which the chessmen should be moved.

In connection with the chart hereinbefore described I employ a number of dice. One die is illustrated at G in Fig. 3, the same being provided with symbols *g*, corresponding in shape to the symbols *b c*, used in the subdivisions of the chart. The die G has its symbols *g* provided in contrasting colors, and any number of dice G may be used in playing the game. Ordinarily I prefer to use three dice each having symbols differently colored and corresponding to the symbols *b c*. When these dice are thrown, the differently-colored symbols appearing on the upper face determine the order of playing or moving the chessmen.

In addition to the dice G, I employ ordinary dice, (indicated at H in Fig. 4.) These ordinary dice are provided on their faces with spots or numbers, and the numbers appearing on the dice determine the number of subdivisions through which the proper chessmen should be moved. The chessmen (indicated at I) may be of any suitable form, and they are adapted to be placed at the beginning of the game in the starting-divisions B or the numbered stations F.

The game may be played under any suitable rules, and any suitable number of chessmen and dice G H may be used.

The game may properly be called a "clover" game, from the fact that clover-leaves are employed as the symbols in the divisions and on the dice G, and it may be played by two, three, four, five, or six persons. When the game is played by two persons, each player takes three chessmen of different colors, and the leading player may take the chessmen colored green, white, and red, while the other player will take the black, yellow, and blue chessmen. The chessmen may be divided between the players engaging in the game. Thus when three persons are playing the leader should have two chessmen colored green and white, the second player should select the chessmen colored red and black, and the third player should have the remaining yellow and blue chessmen.

When the game is played by six persons, each takes a chessman of one color. On commencing the game each player will throw a die, such as H, and the one throwing the highest number of spots will take the lead in playing the game. The chessmen should be placed on the starting-divisions B or in the numbered stations F, and the differently-colored chessmen should be placed on the divisions having the symbols of corresponding colors. The players should throw the dice in regular order according to the color which they take; but the different players may throw the dice in any desired order—as, for example, the player having the green chessmen will throw first, the player having the white chessmen will throw second, the player having the red chessmen will throw third, the player having the black chessmen will throw fourth, the fifth throw will be made by the player having the yellow chessmen, and the final throw by the player having the blue.

I do not consider it necessary to recite in detail the number of rules which may be adopted in playing and regulating the game; but it is sufficient to state that the players should throw a number of the dice G H. The colors appearing uppermost on the dice G will denote the different-colored chessmen that should be moved, while the spots appearing on the dice H indicate the number of subdivisions C through which the chessmen may be shifted at any one play.

Having thus described my invention, I claim as new and desire to secure by Letters Patent—

1. In a game apparatus, a chart comprising a series of starting-divisions having symbols of contrasting colors, irregular groups of segmental subdivisions equal in number to one another, and of contrasting colors, each group being disposed in a consecutive and curved order around each starting-division and forming a circuitous path for chessmen, each irregular group being connected terminally with similar and adjacent groups of subdivisions, and an index extending from the starting-division of each irregular group and pointing in the direction in which chessmen are to be moved, combined with a series of colored chessmen.

2. A game apparatus comprising a chart provided with a series of starting-divisions having symbols of contrasting colors and with irregular groups of segmental subdivisions, each group having its successive subdivisions disposed to surround the starting-divisions and forming a circuitous path through which chessmen are adapted to be moved, said chart also having indices extending from the groups of symbolical subdivisions and all pointing in the same direction around the chart, a series of differently-colored chessmen adapted to be placed on the starting-divisions having the differently-colored symbols, and to be moved in circuitous courses through the subdivisions of the successive irregular groups, and dice having colored symbols corresponding to the symbols in the starting-divisions and adapted to control the order of shifting the chessmen and the number of subdivisions of the irregular groups through which the chessmen are to be moved.

3. A game apparatus, comprising a chart provided with starting-divisions having symbols in contrasting colors, and with a series of irregular subdivisions grouped around said starting-divisions to form circuitous courses and having the terminal divisions of each irregular group connected in series by intermediate divisions with the terminal subdivisions of adjacent irregular groups, differently-colored chessmen adapted to be initially placed on the starting-divisions having the colored symbols, and dice provided with symbols colored correspondingly to the symbols of the starting-divisions and adapted to control the order of shifting the colored chessmen and the number of subdivisions of the irregular groups through which said chessmen are to be moved.

In testimony whereof I have signed my name to this specification in the presence of two subscribing witnesses.

JUAN N. ARRIAGA.

Witnesses:
E. M. LEMAY,
FRANCO. CASTELLO.